(12) United States Patent
Bohler et al.

(10) Patent No.: US 7,538,152 B2
(45) Date of Patent: May 26, 2009

(54) LIGHTWEIGHT STRUCTURAL FINISH

(75) Inventors: Markus Bohler, Waterford Works, NJ (US); Michael Flynn, Levitown, PA (US)

(73) Assignee: Construction Research & Technology GmbH, Trostberg (DE)

( * ) Notice: Subject to any disclaimer, the term of this patent is extended or adjusted under 35 U.S.C. 154(b) by 738 days.

(21) Appl. No.: 11/055,351

(22) Filed: Feb. 10, 2005

(65) Prior Publication Data

US 2006/0178461 A1 Aug. 10, 2006

(51) Int. Cl.
*C08J 3/00* (2006.01)
*C08K 3/34* (2006.01)
*C08K 9/00* (2006.01)
*C08L 9/06* (2006.01)

(52) U.S. Cl. ...................... 524/445; 523/200
(58) Field of Classification Search ................ 524/445; 523/200
See application file for complete search history.

(56) References Cited

U.S. PATENT DOCUMENTS

| | | | |
|---|---|---|---|
| 3,769,065 A | 10/1973 | Dunn | |
| 3,897,577 A * | 7/1975 | Hymes | ........................ 427/277 |
| 4,098,755 A | 7/1978 | Plunguian et al. | |
| 4,303,450 A | 12/1981 | Hacker | |
| 6,383,560 B1 | 5/2002 | Ledbetter | |
| 6,545,066 B1 | 4/2003 | Imordino | |
| 6,617,386 B2 * | 9/2003 | Lelli et al. | ................... 524/445 |
| 6,709,508 B2 | 3/2004 | Dietrich et al. | |
| 2002/0017222 A1 | 2/2002 | Luongo | |
| 2003/0005861 A1 | 1/2003 | Dietrich et al. | |
| 2003/0153643 A1 | 8/2003 | Jin et al. | |
| 2004/0211934 A1 * | 10/2004 | LeStarge | ...................... 252/62 |
| 2005/0241540 A1 | 11/2005 | Hohn et al. | |

FOREIGN PATENT DOCUMENTS

GB 905988 9/1962

* cited by examiner

*Primary Examiner*—Randy Gulakowski
*Assistant Examiner*—Michael M Bernshteyn
(74) *Attorney, Agent, or Firm*—Curatolo Sidoti Co., LPA; Joseph G. Curatolo; Peter R. Detorre

(57) ABSTRACT

A lightweight finish composition, method of production and a method of application are provided. The lightweight finish composition comprises a resin dispersion, alkali metal phosphate, alkylolammonium salt of a polyfunctional polymer, and lightweight aggregate such as silica spheres. The lightweight aggregate has a density and weight that is less than those of sand. The combination of alkali metal phosphate and alkylolammonium salt of a polyfunctional polymer stabilizes the lightweight finish composition by preventing the lightweight aggregate from absorbing water, after production of the lightweight finish composition.

9 Claims, No Drawings

LIGHTWEIGHT STRUCTURAL FINISH

BACKGROUND

Exterior insulation and finish systems (EIFS) are multi-layered exterior wall systems that are used on both commercial buildings and homes. EIFS typically comprises the following components: insulation board made of polystyrene or polyisocyanurate foam, which is secured to the exterior wall surface with a specially formulated adhesive and/or mechanical attachment; a durable water-resistant base coat, which is applied on top of the insulation and reinforced with fiberglass mesh for added strength; and a usually textured and durable finish coat typically produced using an acrylic co-polymer technology.

The finish coat composition usually contains in addition to the co-polymer an aggregate that is used for the appearance and durability of the finish coat composition. The coatings used as the outermost layer in EIFS systems are typically supplied in 5-gallon pails that weigh about 70 pounds each. The heavy weight of the pails slows down the productivity of the workers during application of the finish.

To reduce the weight of these finish compositions the aggregate component has been partially replaced with a lighter material to form a lightweight finish. Lightweight finishes utilize naturally occurring aggregates such as perlite, hyperlite, vermiculite, expanded clay and pumice stone. Due to the high porosity, in the prior art these minerals have been coated with silicone to prevent the absorption of water and thickening of the textured finish. However, if the light weight naturally occurring aggregate is not completely coated, shelf life problems can occur due the excessive viscosity of the packaged finish composition.

Therefore, it is desirable to provide a finish composition which is lightweight but does not become excessively viscous after addition of the lightweight aggregate. Additionally, it would be desirable to avoid the extra production step of coating the lightweight aggregate and the reliance on a uniform and complete coating of the lightweight aggregate to avoid substantial thickening of the finish coating.

SUMMARY

A lightweight finish composition is provided which comprises lightweight aggregate wetted out by the combination of an alkali metal phosphate and an alkylolammonium salt of a polyfunctional polymer, and a resin dispersion wherein the combination of an alkali metal phosphate and an alkylolammonium salt of a polyfunctional polymer provides stability to the lightweight finish composition by wetting out the lightweight aggregate such that one week after producing the lightweight finish composition the viscosity as measured in paste units (PU) does not measure more than about 140 paste units and does not deviate by more than about 7 paste units in subsequent measurements.

A method of producing a lightweight finish composition is provided which comprises combining lightweight aggregate with a combination of an alkali metal phosphate and an alkylolammonium salt of a polyfunctional polymer to form a lightweight aggregate wetted out by the combination of an alkali metal phosphate and an alkylolammonium salt of a polyfunctional polymer, and combining the wetted out lightweight aggregate with a resin dispersion to produce the lightweight finish composition.

A method of finishing a wall is provided which comprises the steps of combining lightweight aggregate with a combination of an alkali metal phosphate and an alkylolammonium salt of a polyfunctional polymer to form a lightweight aggregate wetted out by the combination of an alkali metal phosphate and an alkylolammonium salt of a polyfunctional polymer, combining the wetted out lightweight aggregate with a resin to produce a lightweight finish composition, and applying the lightweight finish composition to the wall.

DETAILED DESCRIPTION

A lightweight finish composition is provided that comprises a resin dispersion, a combination of an alkali metal phosphate, and an alkylolammonium salt of a polyfunctional polymer and lightweight aggregate. The lightweight aggregate is used to replace at least a portion of the standard aggregate component in finish compositions and has a density and weight that is less than sand. The combination of the alkali metal phosphate and alkylolammonium salt of a polyfunctional polymer is used to stabilize the lightweight finish composition by preventing the generally porous lightweight aggregate from absorbing the water of the finish composition.

The prevention of water absorption by the lightweight finish composition is provided by the combination of the surfactants, alkali metal phosphate and alkylolammonium salt of a polyfunctional polymer. The combination "wets out" lightweight aggregate such as glass spheres and provides lightweight aggregate that does not substantially absorb water from the lightweight finish composition, thus preventing a substantial increase in the viscosity of a finish composition. Therefore, without any precoating of the lightweight aggregate, a stable lightweight finish composition is produced such that one week after producing the lightweight finish composition the viscosity as measured in paste units (PU) does not measure more than about 140 paste units and does not deviate by more than about 7 paste units in subsequent measurements. In certain embodiments the viscosity of the lightweight finish composition as measured at six weeks after combining the resin dispersion, a combination of an alkali metal phosphate, and an alkylolammonium salt of a polyfunctional polymer and lightweight aggregate is less than about 130 paste units (PU). The lightweight finish composition is "produced" when the resin dispersion, a combination of an alkali metal phosphate, and an alkylolammonium salt of a polyfunctional polymer and lightweight aggregate are combined.

"Wetting or wetted out" is a term common in the industry that indicates the air void volume of a solid substance or particle has been completely or substantially filled with a liquid. Additionally, the properties of the lightweight aggregate can increase the coverage of the finish composition by improving the handling and application characteristics of the lightweight finish composition.

The lightweight finish composition retains the texture, appearance and durability characteristics of existing finishes. The composition can be of various colors and is easily applied to an exterior and/or interior surface, providing uniform durable coverage and having the look and feel of the desired texture.

The lightweight finish composition can reduce the weight of a 5-gallon pail from 70 pounds to 45-50 pounds and provides the same surface area coverage rate. In certain embodiments at least 50% of the volume of the standard aggregate such as silica sand or gravel is replaced with lightweight aggregate. The wetting out of the lightweight aggregate also speeds up the manufacturing process by eliminating the need for precoating the lightweight aggregates with a liquid impervious coating, such as a silicone.

Lightweight aggregates are aggregate materials that have a density and weight that is less than those of sand (which is a density less than about 22 pounds per gallon). They provide strength and in certain embodiments, texture to the finish composition. The lightweight aggregate may be at least one of perlite, vermiculite, fly ash, silica spheres, microballoons, extendospheres, expanded clay, or pumice stone powder, or the like. In certain embodiments, the silica spheres are at least one of glass spheres or ceramic spheres, such as those available from SISCOR, Toronto, Canada.

Surfactants are additives which reduce surface tension, and may form micelles to thereby improve wetting, help disperse pigments, inhibit foam, or emulsify. While not being limited to theory, it is believed that the surfactant combination of alkali metal phosphate and alkylolammonium salt of a polyfunctional polymer lowers the surface tension of the water such that the water is able to fill the voids in the lightweight aggregate. In certain embodiments, the alkali metal phosphate is potassium tripoly phosphate (KTPP) and the alkylolammonium salt of a polyfunctional polymer is at least one of an alkylolammonium salt of a polyacrylate or an alkylolammonium salt of a polymethacrylate. An example of an alkylolammonium salt of a polyfunctional polymer is Disperbyk® 187 produced by BYK Chemie GmbH of Wesel, Germany.

Resin dispersions may comprise acrylic polymers which are aqueous dispersions of polymers, copolymers, or terpolymers of acrylic acid, acrylic acid ester, methacrylic acid, methacrylic acid ester, styrene acrylic acid, styrene acrylic acid ester, acrylonitrile, non-acrylic polymers such as polyvinyl acetate, styrene butadiene or mixtures thereof. Polymers that may be used can have greater or lesser flexibility depending upon the desired properties of the final finish product. A highly flexible latex will provide, for example, an elastomeric finish.

In addition to lightweight aggregate, alkali metal phosphate, alkylolammonium salt of a polyfunctional polymer and resin dispersions, the lightweight finish composition may also contain components such as solvents, coalescing agents, thickening agents, defoamers, preservatives, flash rust inhibitor, fillers, pigments, or standard aggregate.

A solvent is a liquid and can include odorless mineral spirits and coalescents. Solvents aid in the development and formation of a film by the polymer in the curing process of the coating. They can be used in the manufacture of a coating to dissolve or disperse the film forming constituents. After application the solvent evaporates during drying and therefore does not become part of the dried film. A coalescing agent is a solvent with a high boiling point which, when added to a coating, aids in film formation via temporary plasticization (softening) of the liquid vehicle Coalescing agents may include diethylene-glycol ethyl ether, diethylene glycol ethyl ether acetate, hexylene glycol, and 2-butoxyethanol acetate, and the like. Suppliers of coalescents include Eastman Chemical—Perth Amboy, N.J., Dow Chemical—Midland, Mich. and Union Carbide—Houston, Tex.

Another solvent is odorless mineral spirits, which is a clear liquid solvent that is added to reduce stickiness in application. The addition of odorless mineral spirits lowers the surface tension of the coating which allows for a slower cure rate immediately after application to a surface.

A thickening agent, also referred to as a rheology modifier, is any material used to thicken a liquid and/or an additive used to thicken (increase viscosity) or modify the rheology of a coating. The thickening agent increases the viscosity of the lightweight finish composition to provide a consistency which allows the application of a single thick film or multiple applications to build up a thick film on a vertical surface. The thickening prevents sagging of the thick film of the lightweight finish composition on a vertical surface prior to set up or drying.

Thickening agents that may be used include alkali soluble emulsions, hydrophobically modified alkali soluble emulsions, alginates, hydroxyethyl cellulose, hydrophobically modified hydroxyethyl cellulose, hydrophobically modified polyurethanes, acrylamides, and hydrophobically modified polyacrylamides. In certain embodiments thickening agents may include alkali soluble emulsions, hydrophobically modified alkali soluble emulsions, and hydroxyethyl cellulose. Suppliers of thickening agents that can be used are Rohm and Haas—Philadelphia, Pa. and Union Carbide—Houston, Tex.

A defoamer is an additive used to reduce or eliminate foam formed in a coating or a coating constituent. Examples of defoamers are mineral oil based defoamers, such as silica filled polymethylsiloxane and NOPCO®NXZ produced by Henkel Corporation—Gulph Mills, Pa. Further examples of commercially available defoamers include products available from Crucible Chemical Company—Greenville, S.C.

A preservative may be a biocide which is used to prevent spoilage caused by bacterial growth in a coating that can cause odor or produce enzymes that can break down defoamers, coalescing agents, dispersants, stabilizers and thickening agents such as cellulosic thickeners used in aqueous paints and coatings. The addition of a biocide will contribute to preventing gas formation and foul odor, along with avoiding adverse effects on viscosity and stability. Examples of preservatives are amino alcohols, such as NUOSEPT®91 produced by International Specialty Products—Wayne, N.J., DOWICIL™ 75 and DOWICIL™ QK-20 manufactured by The Dow Chemical Company—Midland, Mich. Other companies providing commercially available biocides include Troy Chemical—Hackensack, N.J. and CreaNova—Piscataway, N.J. In certain embodiments, the preservative may be a fungicide or a mildewcide which may be included in the composition instead of or in addition to a biocide. The addition of a fungicide or mildewcide helps with resistance to fungal growth of the coating on the wall. Commercially available fungicides and mildewcides can be obtained from Troy Chemical—Hackensack, N.J., CreaNova—Piscataway, N.J. and Rohm and Haas—Philadelphia, Pa. Other biocides and fungicides include halogenated acetylene alcohols, diphenyl mercuric dodecenyl succinate, o-phenylphenol and its sodium salt, tri-chlorophenols and their sodium salts.

A flash rust inhibitor is an additive used to inhibit the corrosion that occurs during the drying process of a water-based coating. Examples of flash rust inhibitors generally used in the industry are sodium benzoate and sodium nitrite.

Fillers/pigments are finely ground, natural or synthetic, inorganic or organic, insoluble dispersed particles (such as powder) which, when dispersed in a liquid vehicle to make a coating, may provide, in addition to color, many of the properties of the coating such as opacity, hardness, durability, etc. Additionally, fillers may be added to lower the cost of the lightweight finish composition. Fillers, also referred to as extenders, which may be used include clay, mica and wollastonite.

Clay fillers may include fine china clay/aluminum silicate fillers. For example, Kaofine™ is a coating clay that is available from the Thiele Kaolin Company of Sandersville, Ga. In addition, other commercially available clay fillers are available from Huber Engineered Materials—Atlanta, Ga. In certain embodiments coarse fillers are used and may be calcium carbonate or silica flour of a 200-mesh size (or average of 75 microns).

In certain embodiments colored or white pigments including mineral products which can be used as fillers and extenders may be used. Among the pigments that may be used are the various water insoluble organic and inorganic paint pigments which include, but are not limited to, iron oxides, titanium dioxide, zinc oxide, phthalocyanine blue and green, lead chromate, barium sulfate, zinc sulfide, silica, calcium carbonate, chrome green, iron blues and magnesium silicate (talc). Pigment dispersing agents, including but not limited to, tetrasodium pyrophosphate, lecithin, gum Arabic, sodium silicate, various water soluble soaps, aliphatic and aromatic sulfonates, the aliphatic sulfates, various polyethers and ether alcohol concentrates and the like, may be added to enhance the dispersion of the pigments.

Standard aggregates are inert solid mineral containing materials, such as natural sand, manufactured sand, gravel, and the like. Aggregates are solid granular particles which may impart surface texture to the dried layer of the exterior finishing composition. Further, the size of the aggregate may be used to determine the minimum applied thickness of the exterior finishing composition, especially for application by trowel. Suitable aggregates include sand and stone chips such as marble chips and granite chips.

The lightweight finish composition may contain other components such as emulsifiers; dispersants; curing agents such as organosilanes, epoxies, and isocyanates; plasticizers; fibers such as polyethylene fiber, wollastonite, cellulose fiber, and glass fiber; and pH modifiers such as sodium hydroxide, potassium hydroxide, 2-methyl-1-propanol, and ammonia.

In one embodiment the lightweight finish composition comprises an alkali metal phosphate, an alkylolammonium salt of a polyfunctional polymer, lightweight aggregate, and a resin dispersion wherein the combination of the alkali metal phosphate and alkylolammonium salt of a polyfunctional polymer provides stability to the lightweight finish composition by wetting out the lightweight aggregate such that one week after producing the lightweight finish composition the viscosity as measured in paste units (PU) does not measure more than about 140 paste units and does not deviate by more than about 7 paste units in subsequent measurements. In certain embodiments the alkali metal phosphate may comprise potassium tripoly phosphate and the alkylolammonium salt of a polyfunctional polymer may comprise at least one of an alkylolammonium salt of a polyacrylate, or an alkylolammonium salt of a polymethacrylate. The lightweight aggregate may comprise at least one of perlite, vermiculite, fly ash, silica spheres, microballoons, extendospheres, expanded clay, or pumice stone powder. In certain other embodiments the silica spheres are at least one of glass spheres or ceramic spheres. The resin dispersion may comprise acrylic polymers which are aqueous dispersions of polymers, copolymers, or terpolymers of acrylic acid, acrylic acid ester, methacrylic acid, methacrylic acid ester, styrene acrylic acid, styrene acrylic acid ester, acrylonitrile, non-acrylic polymers such as polyvinyl acetate, styrene butadiene or mixtures thereof.

The lightweight finish composition may be used in exterior and interior applications such as multilayered exterior wall systems, including EIFS. The lightweight finish composition may be applied onto horizontal surfaces as well as vertical surfaces.

Various methods may be used to apply the lightweight finish composition including troweling, spraying with air or airless hopper guns, brushing, rolling extruding, and the like.

A "paste unit" (PU) is defined as a viscosity measurement made with a Stormer viscometer using a spindle with two thin bars extending from a central shaft.

To counter the tendency of glass spheres to absorb water and substantially thicken compositions, several samples were prepared to stabilize the lightweight finish composition by using a combination of alkali metal phosphate and alkylolammonium salt of a polyfunctional polyacrylate, to wet out the lightweight aggregate.

The samples were prepared using a ribbon blender or Schold mixer. The lightweight finish composition may be prepared by admixing the components using conventional mixing methods known in the art, including paddle type mixers, high speed dispersators, and ribbon blenders. To prepare the lightweight aggregate, water, alkali metal phosphate, alkylolammonium salt of a polyfunctional polyacrylate and glass spheres were first added to the blender/mixer followed by the components listed below. All samples tested were prepared using the basic finish formulation shown in Table 1:

TABLE 1

| Component | Wt (lb) | Vol (gal) |
| --- | --- | --- |
| Water | 10.2 | 1.2 |
| Mineral Oil Based Defoamer | 0.15 | 0.02 |
| Silica Spheres | 11.2 | 3.4 |
| Acrylic Polymer | 26 | 2.94 |
| Silica Sand | 27 | 1.22 |

Wt (lb)—weight in pounds
Vol (gal)—volume in gallons

Results of the tests are set forth in Table 2.

TABLE 2

| Sample | ASPP (gm/gal) | AMP (gm/gal) | Initial Viscosity (PU) | WPG lbs. | Viscosity 1 Day (PU) | Viscosity 1 week (PU) | Viscosity 2 weeks (PU) | Viscosity 3 weeks (PU) | Viscosity 4 weeks (PU) |
| --- | --- | --- | --- | --- | --- | --- | --- | --- | --- |
| S1 | 0 | 0 | 89 | 9.6 | 102 | unstable | | | |
| S2 | 12 | 4 | 79 | 9.5 | 89 | 126 | 134 | 135 | 128 |
| S3 | 16 | 4 | 82 | 9.4 | 89 | 132 | 141 | 140 | 139 |
| S4 | 24 | 8 | 76 | 9.7 | 81 | 122 | 131 | 128 | 135 |
| S5 | 24 | 0 | 79 | 9.4 | 91 | 139 | | unstable | |
| S6 | 12 | 8 | 76 | 9.7 | 85 | 136 | 137 | 138 | 136 |
| S7 | 16 | 6 | 76 | 9.3 | 83 | 117 | 129 | 123 | 126 |
| S8 | 16 | 8 | 73 | 9.5 | 79 | 115 | 120 | 119 | 119 |
| S9 | 0 | 8 | 88 | 9.4 | 96 | 136 | 138 | unstable | |
| S10 | 24 | 4 | 74 | 9.4 | 83 | 122 | 125 | 126 | 131 |

PU = paste unit
WPG = weight per gallon
ASPP = alkylolammonium salt of a polyfunctional polyacrylate
AMP = alkali metal phosphate
Gm/gal = grams per gallon Initial viscosity of the sample finish compositions (S1-10) is low, around 70 to 90 PU. Within a couple of days, the samples containing lightweight aggregate that had been wetted out in the presence of alkali metal phosphate and alkylolammonium salt of a polyfunctional polyacrylate (S2-4, S6-8, and S10) had stable viscosities over a period of time. This is in comparison to the samples that were not stable over time, which contained neither ASPP or AMP (S1), or solely AMP (S5) or ASPP (S9). Samples S1, S5, and S9 were listed in Table 2 as unstable when no more measurements could be obtained, which generally indicated a viscosity of above 140 PU's.

TABLE 3

| Component | Wt (lb) | Vol (gal) |
|---|---|---|
| Water | 10.2 | 1.2 |
| Mineral Oil Based Defoamer | 0.15 | 0.02 |
| Silica Spheres | 11.2 | 3.4 |
| Acrylic Polymer | 26 | 2.94 |
| Silica Sand | 27 | 1.22 |
| ASPP | 0.6 | 0.07 |
| AMP | 0.3 | 0.01 |

Wt (lb)—weight in pounds
Vol (gal)—volume in gallons
ASPP = alkylolammonium salt of a polyfunctional polyacrylate
AMP = alkali metal phosphate All samples tested in Table 4 were prepared as described in Table 1 and contained the following finish formulation shown in Table 3. Application testing of the textured finish compositions described in Table 3 showed good application properties and texture.

TABLE 4

| | Samples | | |
|---|---|---|---|
| | S11 | S12 | S13 |
| Initial Visc. | 71 PU | 83 PU | 87 PU |
| PH | 10.1 | 10.1 | 10.1 |
| WPG | 9.5 | 8.9 | 9.9 |
| Drying Time | | | |
| RT | 4 hrs | 6 hrs | 4 hrs |
| 40 F. | 16 hrs | 18.5 hrs | 16 hrs |
| Wash-off (40 F.) | Pass | pass | pass |
| Coverage per ft$^2$ | 0.35 lbs. | 0.38 lbs. | 0.33 lbs. |
| per 45 lbs. | 129 ft$^2$ | 118 ft$^2$ | 136 ft$^2$ |
| per 50 lbs. | 143 ft$^2$ | 132 ft$^2$ | 152 ft$^2$ |
| Storage Stability | | | |
| 1 day | 79 PU | 91 PU | 100 PU |
| 1 week | 120 PU | 129 PU | 127 PU |
| 2 weeks | 119 PU | 127 PU | 129 PU |
| 3 weeks | 117 PU | 125 PU | 125 PU |
| 4 weeks | 121 PU | 132 PU | 126 PU |
| Water Absorption | | | |
| 24 hrs | 12.2% | 14.1% | 12.5% |
| 48 hrs | 12.5% | 14.4% | 12.7% |
| Water Pick Up (lb./ft$^2$) | | | |
| 0.5 hr. | 0.0610 | 0.0729 | 0.0647 |
| 1 hr. | 0.0719 | 0.0883 | 0.0741 |
| 2 hr. | 0.0801 | 0.0985 | 0.0838 |
| 3 hr. | 0.0834 | 0.1051 | 0.0868 |
| 4 hr. | 0.0873 | 0.1071 | 0.0903 |
| 5 hr. | 0.0893 | 0.1108 | 0.0916 |
| 6 hr. | 0.0895 | 0.1098 | 0.0926 |
| 7 hr. | 0.0879 | 0.1083 | 0.0909 |
| 8 hr. | 0.0873 | 0.1049 | 0.0901 |
| 24 hr. | 0.0805 | 0.0911 | 0.0844 |
| 48 hr. | 0.0877 | 0.0938 | 0.0885 |

RT = room temperature
WPG = weight per gallon
PU = paste unit

The samples (S11-S13) maintained a low viscosity over time with little increase in PU noted after 1 week of storage. Additionally, the coverage per square foot (ft$^2$) of the samples was improved over finish compositions containing standard aggregate, which average 0.5 pounds per ft$^2$ coverage.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A lightweight finish composition comprising:
   a) lightweight aggregate wetted out by the combination of an alkali metal phosphate and an alkylolammonium salt of a polyfunctional polymer wherein the alkali metal phosphate is present in an amount of from about 0.1% to about 0.9% and the alkylolammonium salt of a polyfunctional polymer is present in an amount of from about 0.1% to about 0.9% by weight of the lightweight finish composition; and
   b) a resin dispersion
wherein the combination of the alkali metal phosphate and the alkylolammonium salt of a polyfunctional polymer provides stability to the lightweight finish composition by wetting out the lightweight aggregate such that three weeks after producing the lightweight finish composition the viscosity as measured in paste units (PU) does not measure more than about 140 paste units.

2. The composition of claim 1 wherein the alkali metal phosphate is potassium tripoly phosphate.

3. The composition of claim 1 wherein the alkylolammonium salt of a polyfunctional polymer is at least one of an alkylolammoniuni salt of a polyacrylate or an alkylolammonium salt of a polymethacrylate.

4. The composition of claim 1 wherein the lightweight aggregate is at least one of perlite, vermiculite, fly ash, silica spheres, microballoons, extendospheres, expanded clay, pumice stone powder or combinations thereof.

5. The composition of claim 4 wherein the silica spheres are at least one of glass spheres or ceramic spheres.

6. The composition of claim 1 wherein the resin dispersion comprises at least one of an acrylic polymer, a non-acrylic polymer or mixtures thereof; wherein the acrylic polymer, if present, is at least one of acrylic acid, acrylic acid ester, methacrylic acid, methacrylic acid ester, styrene acrylic acid, styrene acrylic acid ester, acrylonitrile or mixtures thereof; and, the non-acrylic polymer, if present, is at least one of polyvinyl acetate, styrene butadiene or mixtures thereof.

7. The composition of claim 1 further comprising at least one of emulsifiers, curing agents, dispersants, plasticizers, fibers, thickening agents, coalescing agents, pH modifiers, defoamers, rust inhibitors, fillers, pigments, pigment dispersing agents, solvents, preservatives or aggregates.

8. The composition of claim 1 wherein after six weeks from combining the alkali metal phosphate, alkylolammonium salt of a polyfunctional polymer, lightweight aggregate and resin dispersion, the viscosity of the unset composition is less than about 130 paste units.

9. The composition of claim 1 wherein the composition has a weight of about 45 to about 50 pounds per 5 gallons volume.

* * * * *